United States Patent
Intrator et al.

(10) Patent No.: US 7,239,580 B2
(45) Date of Patent: Jul. 3, 2007

(54) NOISE ADAPTIVE SONAR SIGNAL PROCESSOR

(75) Inventors: Nathan Intrator, Providence, RI (US); Leon N. Cooper, Providence, RI (US); Nicola Neretti, Jamaica Plain, MA (US)

(73) Assignee: Brown University, Providence, RI (US)

( * ) Notice: Subject to any disclaimer, the term of this patent is extended or adjusted under 35 U.S.C. 154(b) by 38 days.

(21) Appl. No.: 10/559,623

(22) PCT Filed: Jun. 8, 2004

(86) PCT No.: PCT/US2004/018059

§ 371 (c)(1),
(2), (4) Date: Dec. 6, 2005

(87) PCT Pub. No.: WO2005/006009

PCT Pub. Date: Jan. 20, 2005

(65) Prior Publication Data

US 2006/0140054 A1    Jun. 29, 2006

Related U.S. Application Data

(60) Provisional application No. 60/476,847, filed on Jun. 9, 2003, provisional application No. 60/476,849, filed on Jun. 9, 2003.

(51) Int. Cl.
*G01S 15/02* (2006.01)
*G01S 15/06* (2006.01)
*G01S 15/32* (2006.01)

(52) U.S. Cl. .................... 367/101; 367/99; 367/131

(58) Field of Classification Search ............. 367/87, 367/99, 101, 131
See application file for complete search history.

(56) References Cited

U.S. PATENT DOCUMENTS

| 4,054,862 A | 10/1977 | Backman, Jr. ........... 340/3 R |
| 5,481,504 A | 1/1996 | Rosenbach et al. ......... 367/101 |
| 5,889,490 A | 3/1999 | Wachter et al. ............ 342/127 |
| 5,949,739 A | 9/1999 | Reese ........................ 367/100 |

*Primary Examiner*—Ian J. Lobo
(74) *Attorney, Agent, or Firm*—Weingarten, Schurgin Gagnebin & Lebovici LLP (57) ABSTRACT

A system and method of performing sonar range estimations in a noisy sonar environment. The system includes a sensor, a transmitter, a receiver, a plurality of band-pass filters, a cross correlator, and a data analyzer. The transmitter transmits a pulse through a transmission medium. The pulse travels through the transmission medium until it strikes an object, which returns an echo to the sensor. The sensor provides the echo to the receiver, which provides an indication of the echo to the band-pass filters. The respective band-pass filters provide filtered versions of the echo and pulse to the cross correlator, which performs multiple cross correlation operations on the filtered echo and pulse. The cross correlator provides output data to the data analyzer, which uses the data to estimate the SNR in the environment and to determine a pulse center frequency corresponding to the estimated SNR. By controlling the center frequency of pulses emitted by the transmitter based on information provided by the data analyzer, the system obtains sonar range estimations with increased accuracy.

30 Claims, 6 Drawing Sheets

NOISE ADAPTIVE SONAR SIGNAL PROCESSOR

CROSS REFERENCE TO RELATED APPLICATIONS

This application claims priority of U.S. Provisional Patent Application No. 60/476,847 filed Jun. 9, 2003 entitled ESTIMATION OF BACKGROUND NOISE AND ITS EFFECT ON SONAR RANGE ESTIMATION, and U.S. Provisional Patent Application No. 60/476,849 filed Jun. 9, 2003 entitled NOISE ADAPTIVE SONAR SIGNAL PROCESSOR.

STATEMENT REGARDING FEDERALLY SPONSORED RESEARCH OR DEVELOPMENT

The present invention was made with Government support under U.S. Government Contract Nos. ARO DAAD 19-02-1-0403 and ONR N00012-02-C-02960.

BACKGROUND OF THE INVENTION

The present application relates generally to sonar systems, and more specifically to systems and methods of increasing the accuracy of sonar range measurements.

Sonar systems are known that employ sonar pulses reflected from an object or target to estimate a distance to the target (also known as estimating the range of the target). Such sonar systems include side-scan sonar systems, forward and downward-looking sonar systems, 2-D and 3-D sonar systems, and synthetic aperture sonar systems. A conventional sonar system for performing sonar range estimation is typically configured to transmit one or more sonar pulses comprising sonic or supersonic pressure waves toward a selected target, and to receive one or more sonar pulses reflected from the target. Such reflected sonar pulses, which are commonly called echoes or returns, may include a significant amount of background noise and/or other interfering signals in addition to a reflected sonar signal of interest. The conventional sonar system typically includes a coherent receiver (also known as a matched filter receiver) configured to: receive both the echo and a representation of the transmitted sonar pulse. For example, the coherent receiver may comprise a cross correlator. The echo and the representation of the transmitted sonar pulse are cross-correlated within the coherent receiver to generate a peak cross correlation value, which is compared to a predetermined threshold value. If the cross correlation value is greater than the predetermined threshold value, then the reflected sonar signal of interest has been successfully detected. The conventional sonar system then utilizes the cross correlation peak to obtain a measure of the range of the target.

One drawback of the above-described conventional sonar system is that the level of background noise and/or other interfering signals contained within the echo or return may be sufficient to cause the reflected sonar signal to go undetected or to be falsely detected, thereby causing the cross correlator to produce inaccurate range measurements. Such inaccurate range measurements are likely to occur in low signal-to-noise ratio (SNR) sonar environments, in which the noise power within the echo may be comparable to or greater than the reflected signal power. This can be problematic in sonar range estimation systems because a reduction in the measurement accuracy of the cross correlator typically leads to a concomitant reduction in sonar range accuracy.

Prior attempts to increase the accuracy of sonar range measurements in noisy sonar environments have included filtering out at least some of the background noise before providing the echo to the cross correlator. However, such attempts have generally not worked well enough to allow successful detection of reflected sonar signals and accurate estimation of range in low SNR sonar environments. This is due, at least in part, to the fact that sonar systems typically receive sonar pulses that include various types of noise from a variety of different noise sources. For example, a sonar system may transmit sonar pulses through a medium such as water from a ship or submarine that produces noise across a wide range of frequency. Further, other ships, submarines, or structures producing noise across wide frequency ranges may be within the vicinity of the sonar system. Moreover, the natural interaction of the water and objects within the water including the selected target may produce a substantial amount of ambient noise.

Various adaptive beam forming and noise cancellation techniques have been employed in an attempt to minimize the effect of noise on sonar range estimation. However, such techniques generally require some knowledge of the characteristics of the noise source. For this reason, such techniques are usually most effective when used to minimize the effect of the noise produced by the ship or submarine carrying the sonar system, which is relatively easy to characterize. However, such techniques are typically ineffective when the source of the noise is unknown.

In addition, sonar ranging systems may receive echoes from a plurality of selected (and unselected) targets, each target having its own associated noise level, and it may be desirable to determine the noise level and range of each target separately. Such noise associated with multiple targets may be stationary or non-stationary, linear or nonlinear, or additive or non-additive. Further, at least some of the background noise may result from reverberations and/or random signal distortions of the transmitted or reflected sonar pulse, and therefore both the noise level and its structure may be significantly affected by the transmitted sonar signal. However, conventional sonar systems are generally incapable of accurately estimating noise levels and target ranges in the presence of non-stationary, nonlinear, non-additive, and/or signal-dependent noise.

Moreover, the density and temperature of the transmission medium (e.g., water) and the frequency of the transmitted/reflected sonar signal may affect the decay rate of the sonar pulse propagating through the medium. In addition, the absorption of certain frequencies of the transmitted sonar pulse by the target may affect the strength of the resulting echo or return. The sonar pulse strength, frequency range, medium dispersion properties, shape, and duration may also affect the accuracy of sonar range measurements. However, conventional sonar systems are generally incapable of fully compensating for such factors when called upon to generate accurate noise and range estimates.

It would therefore be desirable to have a system and method of performing sonar range estimation that takes into account the effects of background noise whether the noise is stationary or non-stationary, linear or non-linear, additive or non-additive, or signal-dependent or non-signal-dependent. It would also be desirable to have a method of performing sonar range estimation that can be used to increase sonar ranging accuracy in low SNR sonar environments.

BRIEF SUMMARY OF THE INVENTION

In accordance with the present invention, a system and method is provided that permits sonar range estimation in a noisy sonar environment. Benefits of the presently disclosed system and method are achieved by obtaining an estimate of the signal-to-noise ratio (SNR) in the sonar environment, determining the effect of the estimated SNR on sonar ranging accuracy, and adapting the system and method to account for the determined effect of the SNR.

In one embodiment, a system for performing sonar range estimation in a noisy sonar environment comprises a sensor, a transmitter, a receiver, a plurality of band-pass filters, a cross correlator, and a data analyzer. The sonar transmitter is configured to transmit at least one sonar pulse through a transmission medium such as air, water, soil, living tissue, or any other suitable transmission medium. The transmitted pulse travels through the transmission medium until it strikes an object, which returns at least one reflected pulse (echo or return) to the sensor. The sensor is configured to provide a signal representative of the echo to the sonar receiver, which subsequently provides an indication of the echo to the plurality of band-pass filters. Each band-pass filter is configured to pass a respective sub-band of frequencies, in which the respective frequency sub-bands substantially span the frequency range of the transmitted pulse. The echo and a representation of the transmitted pulse are filtered by the respective band-pass filters, which provide filtered versions of the echo and pulse to the cross correlator. The cross correlator is configured to perform multiple cross correlation operations, in which each cross correlation operation operates on filtered versions of the echo and pulse produced by a respective one of the band-pass filters. The cross correlator provides cross correlation output data to the data analyzer, which is operative to analyze the data to determine the variability of cross correlation peaks within each frequency sub-band, and to identify the lowest frequency sub-band having a corresponding low peak ambiguity. By referencing the peak variability versus SNR corresponding to the identified frequency sub-band, which may be theoretically or empirically determined, the data analyzer is further operative to provide an estimation of the SNR within the sonar environment of interest, and an indication of the center frequency of sonar pulses that may be employed to perform accurate sonar ranging within that environment. The sonar system adapts to the estimated SNR by dynamically changing the frequency of the transmitted pulses to concur with the center frequency indication provided by the data analyzer.

By adapting to the estimated SNR within the sonar environment of interest, the presently disclosed system and method may be employed to obtain sonar range estimations within that environment with increased accuracy.

The disclosed system and method provides an estimation of the instantaneous SNR of a signal (e.g., a sonar pulse or "ping"). Specifically, if the ping strikes several layers inside the object, the return signal from the inner layers is weaker and therefore the SNR is reduced. Due to reverberations inside the object, the SNR may be further reduced. The presently disclosed system and method estimate the SNR for each returning ping separately, and therefore adapt to the correct bandwidth for each returning ping.

Other features, functions, and aspects of the invention will be evident from the Detailed Description of the Invention that follows.

BRIEF DESCRIPTION OF THE SEVERAL VIEWS OF THE DRAWINGS

The invention will be more fully understood with reference to the following Detailed Description of the Invention in conjunction with the drawings of which.

DETAILED DESCRIPTION OF THE INVENTION

U.S. Provisional Patent Application No. 60/476,847 filed Jun. 9, 2003 entitled ESTIMATION OF BACKGROUND NOISE AND ITS EFFECT ON SONAR RANGE ESTIMATION, and U.S. Provisional Patent Application No. 60/476,849 filed Jun. 9, 2003 entitled NOISE ADAPTIVE SONAR SIGNAL PROCESSOR are incorporated herein by reference.

Systems and methods of performing sonar range estimation are disclosed that may be employed to increase the accuracy of sonar ranging in low SNR sonar environments. The presently disclosed systems and methods are operative to estimate the signal-to-noise (SNR) within the sonar environment of interest, and to adapt to the estimated SNR to obtain sonar range estimations with increased accuracy.

Figure 1:
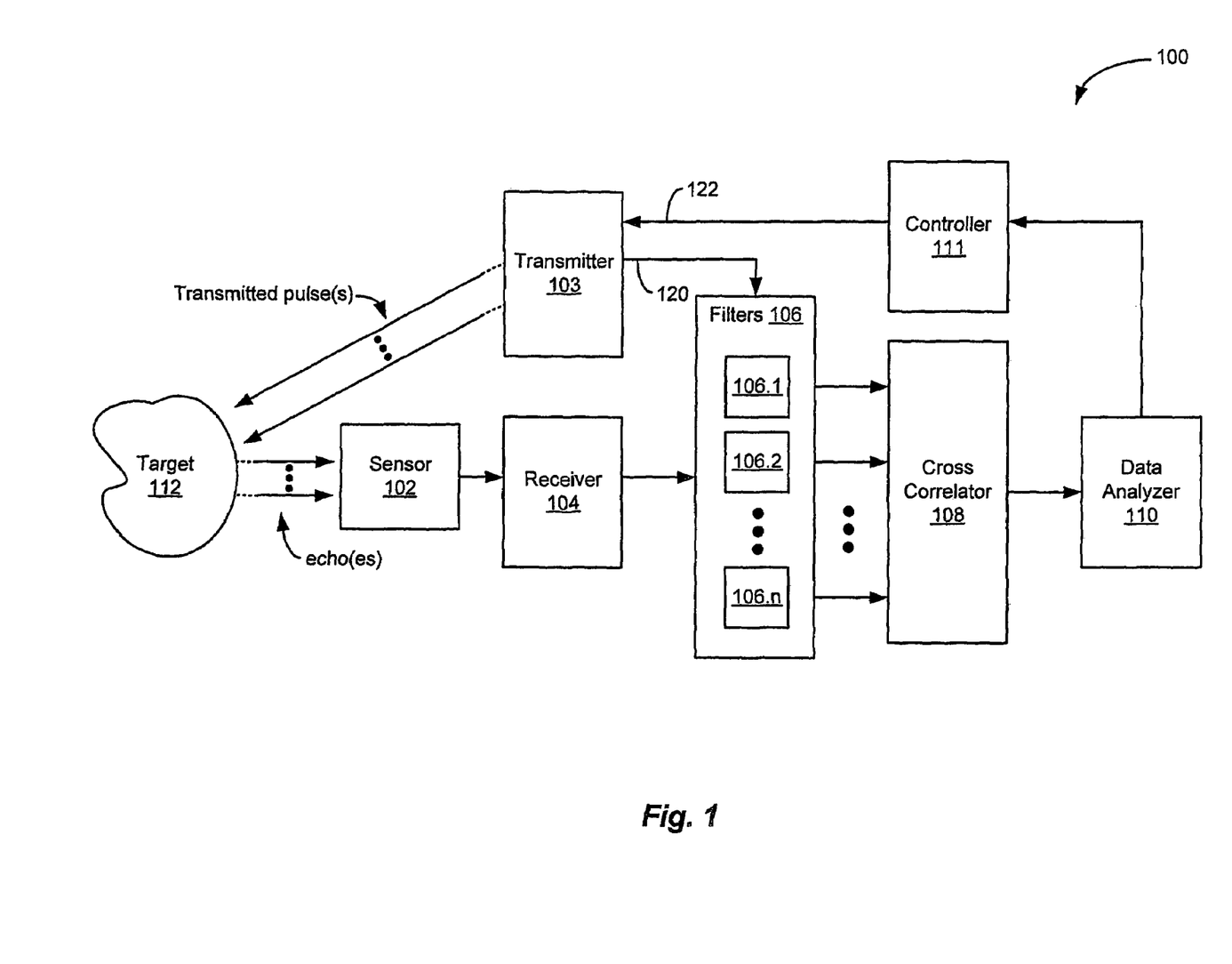
FIG. 1 is a block diagram of a system for performing sonar range estimation in a noisy sonar environment according to the present invention.

FIG. 1 depicts an illustrative embodiment of a system 100 in accordance with the present invention that permits sonar range estimation in a noisy sonar environment. In the illustrated embodiment, the system 100 comprises a sensor 102, a transmitter 103, a receiver 104, a plurality of band-pass filters 106, a cross correlator 108, a data analyzer 110, and a controller 111. It is noted that the illustrative embodiment of the system 100 described herein is suitable for performing range estimation in a noisy sonar environment. For example, the sonar system 100 may be adapted for (1) marine exploration in an underwater environment, (2) seismic exploration in a soil environment, (3) medical ultrasound in an environment comprising living tissue, or any other suitable use in a sonar environment. It should be understood, however, that the presently disclosed system 100 for performing range estimation may also be adapted for use in radar systems, microwave systems, laser systems, or any other suitable system.

Specifically, the sonar system 100 includes the sonar transmitter 103, which is configured to transmit at least one sonar pulse through a transmission medium such as water. The transmitted sonar pulse travels through the water until it strikes an object or target 112 in the water, which returns at least one reflected sonar pulse (commonly known as an echo or return) toward the sonar sensor 102. For example, the sonar sensor 102 may comprise one or more hydrophone sensors. The sensor 102 is configured to sense the echo, and to provide a signal representative of the echo to the sonar receiver 104, which in turn provides an indication of the echo to the plurality of band-pass filters 106.

In the illustrated embodiment, each of the band-pass filters 106.1-106.n is configured to pass a respective sub-band of frequencies, in which the respective frequency sub-bands are defined to span the frequency range of the sonar pulse transmitted by the sonar transmitter 103. For example, in the event the frequency range of the transmitted sonar pulse is about 87 kHz, the respective frequency sub-bands may approximately range from 6-18 kHz, 18-31 kHz, 31-43 kHz, 43-56 kHz, 56-68 kHz, 68-81 kHz, and 81-93 kHz, thereby spanning the pulse frequency range of 87 kHz. Accordingly, in this illustrative example, the center frequency of the frequency sub-bands may be approximately equal to 12 kHz, 25 kHz, 37 kHz, 50 kHz, 62 kHz, 75 kHz, and 87 kHz, respectively.

As shown in FIG. 1, the plurality of band-pass filters 106 is configured to receive the echo indication from the sonar receiver 104, and to receive a representation of the sonar pulse transmitted by the sonar transmitter 103 over a line 120. The echo and the representation of the transmitted pulse are filtered by each of the respective band-pass filters 106.1-106.n, which subsequently provide band-pass filtered versions of the echo and the transmitted pulse to the cross correlator 108. The cross correlator 108 is configured to perform multiple cross correlation operations on the filtered echoes and pulses. Specifically, the cross correlator 108 cross-correlates the filtered versions of the echoes and pulses provided by each of the band-pass filters 106.1-106.n, and provides corresponding cross correlation output data to the data analyzer. 110, which is operative to analyze the data to determine the variability of cross correlation peaks within each frequency sub-band, and to identify the lowest frequency sub-band having a corresponding low peak ambiguity, thereby allowing the data analyzer 110 to estimate the SNR of the sonar environment. The operation of the data analyzer within the presently disclosed system is described in greater detail below. The data analyzer 110 is further operative to provide information to the controller 111, which is operative to cause the sonar transmitter 103 to modify the characteristics of the transmitted pulses to adapt to the estimated SNR. In this way, more accurate sonar ranging is achieved.

Figure 2A:
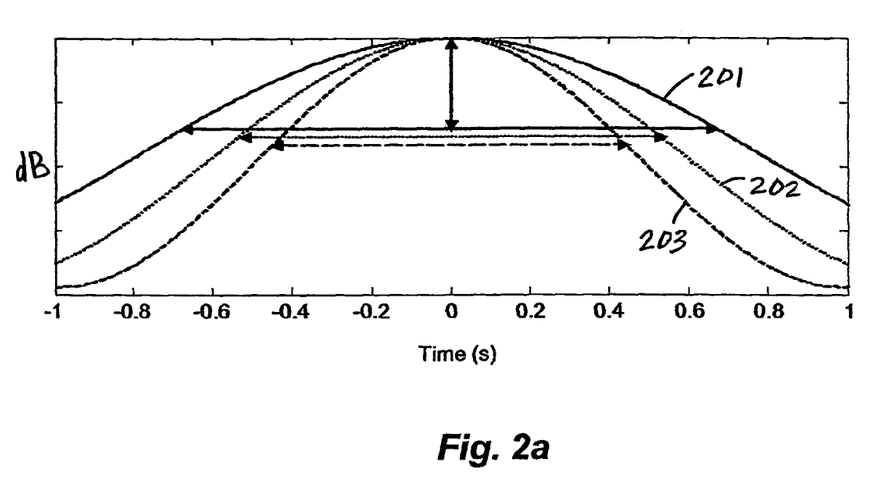
FIGS. 2a-2b are diagrams of ambiguity functions illustrating the effect of noise level on the variability of cross correlation peaks.
Figure 2B:
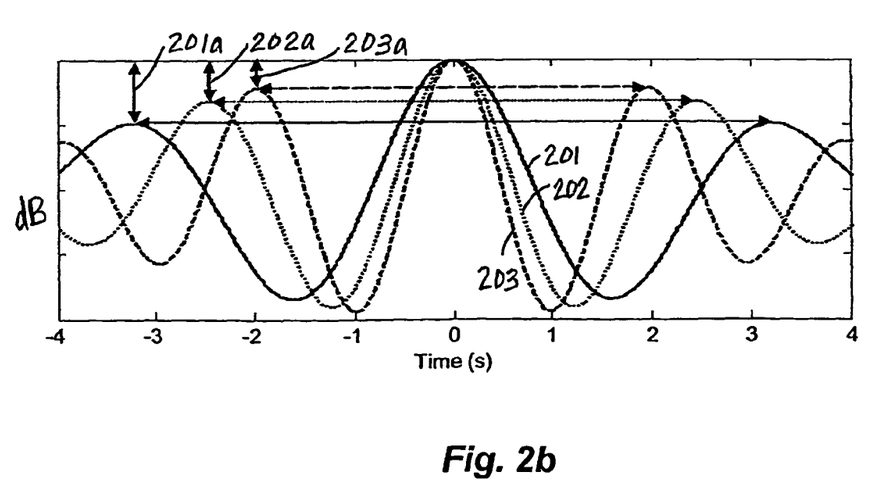

The cross correlation of an echo and a pulse may be expressed as $$\psi_e \cdot \psi_p(\tau) = \int \psi_e(t)\psi_p(t+\tau)dt \Rightarrow \qquad (1)$$

$$= \int \psi_p(t)\psi_p(t+\tau+\tau_0)dt + \int \psi_p(t)\eta(t+\tau)dt,$$

in which the first term "$\int \psi_p(t)\psi_p(t+\tau+\tau_0)dt$" is the autocorrelation of the pulse centered at time $\tau_0$, the second term "$\int \psi_p(t)\eta(t+\tau)dt$" is representative of band-limited white noise with frequency limits defined by the spectrum of the pulse, and the integration operation in each term is performed from $-\infty$ to $+\infty$. FIGS. 2a-2b depict representative ambiguity functions 201-203 that may be employed to describe the output provided by the cross correlator 108 (see FIG. 1). Because the cross correlator 108 cross correlates the filtered echo and pulse provided by each of the band-pass filters 106.1-106.n, each of which passes a respective sub-band of frequencies, it is understood that an ambiguity function may be constructed corresponding to each of the frequency sub-bands.

As shown in FIGS. 2a-2b, the ambiguity functions 201-203 are expressed as functions of pulse amplitude (vertical axis, dB) and delay time (horizontal axis, seconds), which is proportional to range. Specifically, the ambiguity functions 201-203 correspond to the cross correlation of respective echo and pulse pairs having approximately the same frequency range but different center frequency fc (i.e., mean integrated frequency). For example, the ambiguity function 201 corresponds to the cross correlation of a first echo and pulse pair having a low center frequency fc1, the ambiguity function 202 corresponds to the cross correlation of a second echo and pulse pair having an intermediate center frequency fc2, and the ambiguity function 203 corresponds to the cross correlation of a third echo and pulse pair having a high center frequency fc3. FIG. 2a depicts a detailed view of the main lobes of the ambiguity functions 201-203, and FIG. 2b depicts the main lobes and the side lobes of the ambiguity functions 201-203. Each one of the ambiguity functions 201-203 comprises a respective peak value, which is indicative of the range of the object or target returning the echo.

In high SNR sonar environments (i.e., when the noise level is low), the peak of the ambiguity function is generally located at the main lobe of the function. In this case, the peaks of the ambiguity functions 201-203 are regarded as having low ambiguity, and may be located within the width of the main lobes of the functions at about time $\tau_0$, as illustrated by the vertical line of FIG. 2a. It is appreciated that the time $\tau_0$ corresponds to the actual range of the target. The effect of the low level of noise in such high SNR sonar environments is to jitter the position of the peak around the time $\tau_0$. To a first approximation, the magnitude of this jitter (also known as peak variability) is relatively low, e.g., the peak variability is typically-less than the width of the main lobes, as illustrated by the horizontal lines of FIG. 2a. The lengths of the horizontal lines of FIG. 2a are indicative of the levels of peak variability associated with the respective ambiguity functions 201-203. In the illustrated embodiment, the lowest peak variability is associated with the ambiguity function 203 (high center frequency fc3), and the highest peak variability is associated with the ambiguity function 201 (low center frequency fc1).

In low SNR sonar environments (i.e., when the noise level is high, for example, when the noise level is of the order of the difference between the amplitudes of the main lobe and the first side lobe), the peak of the ambiguity function may not be located within the main lobe of the function, but instead may be located at one of the side lobes. In this case, the peaks of the ambiguity functions 201-203 are regarded as having high ambiguity, and may be located (1) within the width of a side lobe at about time $\tau_{-2}$ for function 203, (2) within the width of a side lobe at about time $\tau_{-2.5}$ for function 202, and (3) within the width of a side lobe at about time $\tau_{-3}$ for function 201, as illustrated by the vertical lines 203a, 202a, and 201a, respectively, of FIG. 2b. The effect of the high level of noise in such low SNR sonar environments is to significantly increase the peak variability, thereby increasing the potential error in sonar range estimation. The horizontal lines in FIG. 2b illustrate the potential error in range estimation that can result from such high noise levels.

Figure 3A:
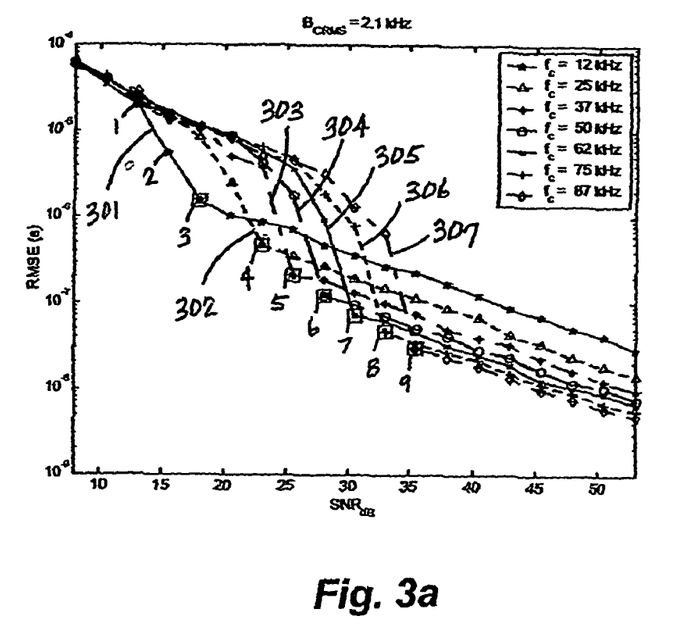
FIG. 3a is a diagram illustrating peak variability as a function of signal-to-noise ratio and center frequency for a plurality of frequency sub-bands.

FIG. 3a depicts peak variability as a function of SNR (dB) and center frequency fc for a plurality of frequency sub-bands. In this illustrative example, peak variability is expressed in terms of root mean square error (RMSE, seconds), which is a temporal representation of the potential error in range estimation. Further, the center frequencies fc of the frequency sub-bands are equal to 12 kHz, 25 kHz, 37 kHz, 50 kHz, 62 kHz, 75 kHz, and 87 kHz, respectively, and the centralized root mean square bandwidth $B_{CRMS}$ of transmitted pulses is fixed at 2.1 kHz.

For example, peak variability curves 301-307, as depicted in FIG. 3*a*, may be obtained via Monte Carlo simulations. Specifically, the transmitted pulses may be expressed as cosine packets of the form $$\psi_{\sigma,\eta}(t)=K_{\sigma,\eta}\exp(-t^2/2\sigma^2)\cos(2\pi\eta t), \quad (2)$$

in which "$\eta$" is the center frequency; "$\sigma$" is the standard deviation of a peak location in time, which controls the spread in time of the pulse and its frequency bandwidth; and, "$K_{\sigma,\eta}$" is a normalization factor such that $$\int \psi^2_{\sigma,\eta}(t)dt = 1, \quad (3)$$

in which the integration operation is performed from $-\infty$ to $+\infty$. Further, white noise may be added to the pulse to generate a noisy echo for the simulation, and a temporal indication of the range estimate may be computed as the time corresponding to the maximum amplitude of the cross correlation between the echo and pulse.

Figure 3B:
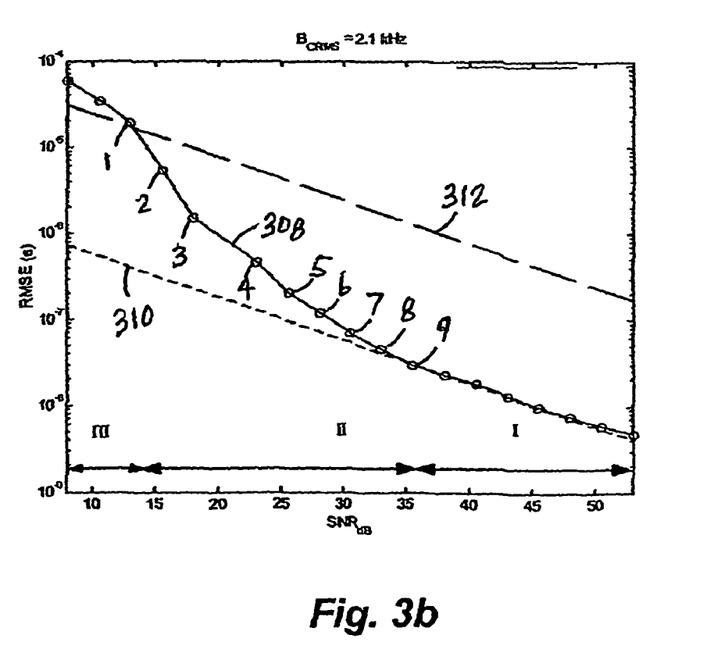
FIG. 3b is a diagram illustrating a performance curve derived from the diagram of FIG. 3b.

As shown in FIG. 3*a*, each of the simulation curves 301-307 is approximately linear within a first SNR range of about 35-50 dB (see also region I of FIG. 3*b*). Further, for each curve 301-307, there is a sharp transition from lower RMSE levels to higher RMSE levels within a second SNR range of about 15-35 dB (see also region II of FIG. 3*b*), thereby indicating significant increases in peak variability. Within a third SNR range of about 5-15 dB (see also region III of FIG. 3*b*), the curves 301-307 are again approximately linear. It is noted that the curve 308 depicted in FIG. 3*b* is a performance curve comprising a partial composite of the peak variability curves 301-307, including break points 1-9 (see FIG. 3*a*). Accordingly, as the SNR decreases (i.e., as the noise level increases), the corresponding RMSE values gradually increase within region I until sharp transitions occur from lower RMSE levels to significantly higher RMSE levels within region II—the RMSE values then continue to increase more rapidly at the higher RMSE levels within region III. It is noted that within region III, the sonar range resolution falls sharply to a point where the sonar is ineffective and the target is considered to be out-of-range.

Specifically, within region I, the simulation curves 301-307 approximately track a line 310 (see FIG. 3*b*), which may be defined as $$\sigma=(2\pi B_{RMS}d)^{-1}, \quad (4)$$

in which "$\sigma$" is the standard deviation of a peak location in time and is proportional to the RMSE, "$B_{RMS}$" is the root mean square bandwidth of the pulse, and "d" is the SNR. A derivation of equation (4) is described in *Probability and Information Theory with Applications to Radar*, P.M. Woodward, New York, McGraw-Hill Book Company, Inc., copyright 1953, which is incorporated herein by reference. It is noted that $B_{RMS}$ may be expressed as $$B_{RMS}=(\int f^2 P_{SD}(f)df)^{1/2}, \quad (5)$$

in which "$P_{SD}(f)$" is the power spectral density of the pulse, and the integration operation is performed from 0 to $+\infty$. Further, d may be expressed as $$d=(2E/N_0)^{1/2}, \quad (6)$$

in which "E" is the total energy of the echo, and "$N_0$" is the spectral density of the noise. Accordingly, $$SNR(dB)=20 \log_{10}d. \quad (7)$$

Moreover, following the sharp transitions from lower RMSE levels to higher RMSE levels within region II (see FIG. 3*b*), the simulation curves 301-307 approximately track a line 312 (see FIG. 3*b*), which may be defined as $$\sigma=(2\pi B_{CRMS}d)^{-1}, \quad (8)$$

in which "$B_{CRMS}$" is the centralized root mean square bandwidth of the transmitted pulse. The RMSE values continue to increase at a faster rate within region III (see FIG. 3*b*). It is noted that $B_{CRMS}$ may be expressed as $$B_{CRMS}=(\int (f-fc)^2 P_{SD}(f)df)^{1/2}, \quad (9)$$

in which "fc" is the center frequency of the pulse, and the integration operation is performed from 0 to $+\infty$. It is further noted that fc may be expressed as $$fc=\int f P_{SD}(f)df, \quad (10)$$

in which the integration operation is performed from 0 to $+\infty$. Moreover, the root mean square bandwidth may be expressed as $$B_{RMS}^2=B_{CRMS}^2+fc^2. \quad (11)$$

Accordingly, in the event the center frequency fc is much larger than the centralized root mean square bandwidth $B_{CRMS}$, $$B_{RMS}\approx fc. \quad (12)$$

The behavior of the simulation curves 301-307 within region I (see FIGS. 3*a*-3*b*) is characteristic of the performance of a "coherent" receiver, which estimates the range of a target relative to a peak of the ambiguity function within the width of the function's main lobe. The behavior of the curves 301-307 after their sharp transitions from lower RMSE levels to higher RMSE levels within region II (see FIGS. 3*a*-3*b*) is characteristic of the performance of a "semi-coherent" receiver, which estimates target range relative to the peak of the envelope of the ambiguity function. As illustrated in FIG. 3*a*, range estimates provided by the semi-coherent receiver have associated errors (RMSE) that are significantly higher than the errors associated with the range estimates of the coherent receiver.

The embodiments disclosed herein will be better understood with reference to the following illustrative examples and FIG. 1. In a first example, the sonar transmitter 103 transmits a single sonar pulse ("ping") having a frequency range of about 87 kHz through a transmission medium such as water. The transmitted ping travels through the water until it strikes the selected target 112, which returns a reflected sonar pulse ("echo") to the sonar sensor 102. It is understood that a typical target may return multiple echoes. The target 112 in this example is described as returning a single echo for clarity of illustration. The sensor 102 provides a signal representative of the echo to the sonar receiver 104, which subsequently provides an indication of the echo to the plurality of band-pass filters 106.

In this illustrative example, the plurality of band-pass filters 106 passes respective frequency sub-bands ranging from 6-18 kHz, 18-31 kHz, 31-43 kHz, 43-56 kHz, 56-68 kHz, 68-81 kHz, and 81-93 kHz, thereby spanning the ping frequency range of 87 kHz. The center frequencies fc of the frequency sub-bands are therefore approximately equal to 12 kHz, 25 kHz, 37 kHz, 50 kHz, 62 kHz, 75 kHz, and 87 kHz, respectively. Further, the centralized root mean square bandwidth $B_{CRMS}$ of the transmitted pulse is fixed at about 2.1 kHz.

Next, the echo and a representation of the transmitted ping are filtered by each of the band-pass filters 106.1-106.$n$, which provide filtered versions of the echo and ping to the cross correlator 108. The cross correlator 108 then performs multiple cross correlation operations on the filtered versions of the echo and ping, and provides multiple sets of cross correlation output data corresponding to the respective frequency sub-bands to the data analyzer 110.

As described above, the data analyzer 110 of the presently disclosed embodiment is operative to analyze the cross correlation output data to determine the variability of cross correlation peaks within each frequency sub-band, and to identify the lowest frequency sub-band having a corresponding low peak ambiguity. To this end, the data analyzer 110 effectively constructs an ambiguity function like the ambiguity functions 201-203 (see FIGS. 2a-2b) for each of the frequency sub-bands 6-18 kHz, 18-31 kHz, 31-43 kHz, 43-56 kHz, 56-68 kHz, 68-81 kHz, and 81-93 kHz, and determines the peak variability for each frequency sub-band using the ambiguity functions.

In this illustrative example, it is assumed that an analysis of the cross correlation output data by the data analyzer 110 determines that the peak variability corresponding to each of the frequency sub-bands 56-68 kHz, 68-81 kHz, and 81-93 kHz is low (i.e., the peak variability is within the width of the main lobe in each of the corresponding ambiguity functions), and the peak variability corresponding to each of the frequency sub-bands 6-18 kHz, 18-31 kHz, 31-43 kHz, 43-56 kHz is high (i.e., the peak variability varies between the side lobes in each of the associated ambiguity functions). In this example, the operation of the sonar system 100 is therefore like that of a coherent receiver when transmitting pings having frequencies ranging from 56-93 kHz, and a semi-coherent receiver when transmitting pings having frequencies ranging from 6-56 kHz.

Accordingly, the data analyzer 110 identifies the frequency sub-band 56-68 kHz as the lowest frequency sub-band having a corresponding low peak ambiguity. Next, the data analyzer 110 analyzes the peak variability data versus SNR for the identified sub-band 56-68 kHz, as depicted in FIG. 3a by the curve 305, and determines the break point on the curve where the sharp transition from low RMSE levels to high RMSE levels begins, i.e., break point 7. It is noted that break point 7 on the peak variability versus SNR curve 305 corresponds to a RMSE of about $10^{-7}$ and an SNR of about 30 dB. The data analyzer 110 therefore estimates the SNR within the sonar environment to be about 30 dB for echoes and pings with a center frequency of 62 kHz and a centralized root mean square bandwidth of 2.1 kHz.

As described above, the data analyzer 110 provides information to the controller 111, which uses this information to cause the sonar transmitter 103 to modify the characteristics of the transmitted pings to adapt to the estimated SNR. To this end, the data analyzer 110 determines that the peak variability versus SNR curve 305 corresponds to the center frequency 62 kHz for the frequency sub-band 56-68 kHz. In this illustrative example, the center frequency 62 kHz is the highest center frequency that has not yet been affected by ambiguity. The data analyzer 110 then identifies this frequency to the controller 111, and the controller 111 causes the sonar transmitter 103 to emit pulses toward the target with a center frequency of 62 kHz and above, up to the maximum frequency available to the system hardware. In this way, the sonar system 100 effectively removes the frequency bands that would create large ambiguities. The sonar system 100 then uses these pulses to obtain more accurate sonar range estimations within the environment of interest. For example, the system 100 may determine, with low ambiguity, the location of the cross correlation peak corresponding to the range of the selected target 112, and may then determine the range of the target 112 based on the peak location.

It should be understood that instead of transmitting a single ping having a frequency range of about 87 kHz and band-pass filtering the resulting echo, as in the first example above, a single ping corresponding to each of the frequency sub-bands 6-18 kHz, 18-31 kHz, 31-43 kHz, 43-56 kHz, 56-68 kHz, 68-81 kHz, and 81-93 kHz may alternatively be transmitted. Next, multiple cross correlation operations may be performed on the echoes and pings corresponding to each frequency sub-band, and multiple sets of cross correlation output data corresponding to the respective frequency sub-bands may be provided to the data analyzer, which generates results essentially the same as those generated in the first example above, i.e., a single distribution is formed by one estimate per frequency band. In both cases, the center frequency fc may be determined such that the overall distribution of cross correlation output data is the combination of two distributions having different standard deviations, i.e., a first distribution corresponding to estimates above the center frequency and a second distribution corresponding to estimates below the center frequency, in which the second distribution has a standard deviation smaller than the first distribution. The determined center frequency fc corresponds to the breakpoint of interest, e.g., break point 7 in the first example above (see FIG. 3a). It is also understood that the data analysis results obtained from transmitting the single broadband ping and those obtained from transmitting the multiple narrow-band pings may be combined to determine the center frequency fc corresponding to the breakpoint of interest.

In a second example, instead of transmitting a single broadband ping having a frequency range of about 87 kHz, the sonar transmitter 103 transmits multiple broadband pings through the water. It is understood that the centralized root mean square bandwidth $B_{CRMS}$ of the multiple pings is fixed at about 2.1 kHz. As in the first example described above, the multiple pings travel through the water until they strike one or more selected targets 112, which return reflected sonar pulses (echoes) to the sonar sensor 102. The sensor 102 in turn provides signals representative of the echoes to the sonar receiver 104, which subsequently provides indications of the echoes to the plurality of band-pass filters 106.

As in the first example above, the plurality of band-pass filters 106.1-106.$n$ passes respective frequency sub-bands ranging from 6-18 kHz, 18-31 kHz, 31-43 kHz, 43-56 kHz, 56-68 kHz, 68-81 kHz, and 81-93 kHz. The center frequencies of the respective frequency sub-bands are therefore approximately equal to 12 kHz, 25 kHz, 37 kHz, 50 kHz, 62 kHz, 75 kHz, and 87 kHz. Accordingly, the sonar receiver 104 provides the pings having center frequencies 12 kHz, 25 kHz, 37 kHz, 50 kHz, 62 kHz, 75 kHz, and 87 kHz to the band-pass filters 106.1-106.$n$ passing sub-bands 6-18 kHz, 18-31 kHz, 31-43 kHz, 43-56 kHz, 56-68 kHz, 68-81 kHz, and 81-93 kHz, respectively.

The echoes and representations of the corresponding transmitted pings are then filtered by the band-pass filters 106, which provide filtered versions of the echoes and pings to the cross correlator 108. The cross correlator 108 performs multiple cross correlation operations on the filtered versions of the echoes and pings, and provides multiple sets of cross correlation output data to the data analyzer 110.

Figure 4A:
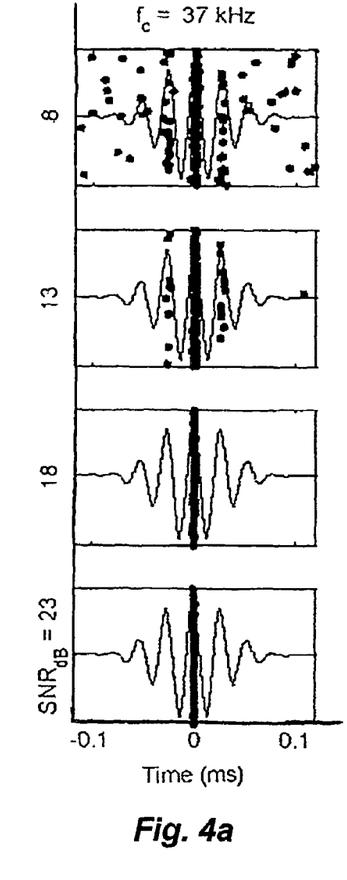
FIGS. 4a-4c are diagrams illustrating empirical estimations of sonar ranging accuracy.
Figure 4B:
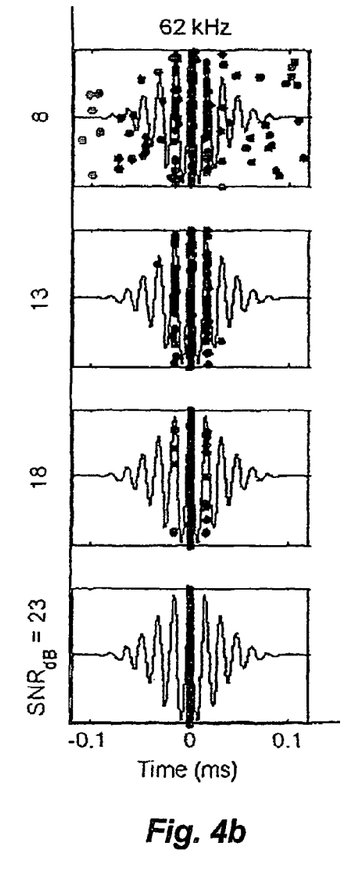
Figure 4C:
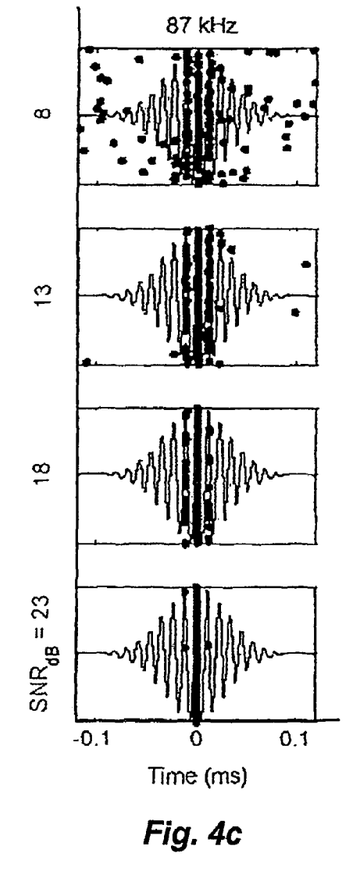

Next, the data analyzer 110 effectively constructs an ambiguity function for the echoes and corresponding transmitted pings. For example, FIG. 4a depicts representative ambiguity functions for multiple broadband pings corresponding to frequency sub-band 31-43 kHz, FIG. 4b depicts representative ambiguity functions for multiple broadband pings corresponding to frequency sub-band 56-68 kHz, and FIG. 4c depicts representative ambiguity functions for multiple broadband pings corresponding to frequency sub-band 81-93 kHz. In each of the ambiguity functions depicted in FIGS. 4a-4c, a black dot is employed to indicate an estimated location of a cross correlation peak, as computed by the data analyzer 110. Accordingly, the data analyzer 110 may use the estimated peak locations (as indicated by the black dots) to perform a statistical analysis for determining the level of peak ambiguity for each ambiguity function.

As shown in FIGS. 4a-4c, the peak variability for each one of the pings having a center frequency equal to 37 kHz, 62 kHz, and 87 kHz, respectively, is indicated by the estimated locations of the corresponding cross correlation peaks. For example, for the pings corresponding to frequency sub-band 81-93 kHz (fc=87 kHz), the majority of the computed peaks are located within the width of the main lobe of the ambiguity function when SNR=23 dB, thereby indicating low peak ambiguity. However, when the SNR is successively reduced from 23 dB to 18 dB, 13 dB, and 8 dB, the peak ambiguity gradually increases, as indicated by the increasing number of computed peaks located outside the main lobe (see FIG. 4c). Similarly, for the pings corresponding to frequency sub-band 56-68 kHz (fc=62 kHz), there is low peak ambiguity when SNR=23 dB, and increasing peak ambiguity as the SNR is successively reduced from 23 dB to 18 dB, 13 dB, and 8 dB (see FIG. 4b); and, for the pings corresponding to frequency sub-band 31-43 kHz (fc=37 kHz), there is low peak ambiguity when SNR=23 dB and 18 dB, and increasing peak ambiguity when the SNR is successively reduced from 18 dB to 13 dB and 8 dB (see FIG. 4c).

Accordingly, the technique of this second example may be employed to obtain an empirical estimation of the SNR in the environment of interest. For example, as shown in FIGS. 4a-4c, the lowest possible SNR is empirically estimated to be about 18 dB. It is understood that varying levels of peak ambiguity and SNR may be obtained depending on the center frequency and frequency range of the pings, and the specific characteristics of the sonar environment. The data analyzer 110 therefore estimates the SNR within the sonar environment to be about 18 dB for echoes and pings with a center frequency of 37 kHz and a centralized root mean square bandwidth of 2.1 kHz.

Next, the data analyzer 110 provides information to the controller 111, which uses this information to cause the sonar transmitter 103 to modify the characteristics of the transmitted pings to adapt to the estimated SNR. In this second example, the center frequency 37 kHz is the highest center frequency that has not yet been affected by ambiguity. The data analyzer 110 then identifies this frequency to the controller 111, and the controller 111 causes the sonar transmitter 103 to emit pings toward the targets 112 with a center frequency equal to 37 kHz and above, up to the maximum frequency available to the system hardware. In this way, the sonar system 100 effectively removes the frequency bands that would create large ambiguities. The sonar system 100 then uses these pings to obtain more accurate sonar range estimations within the environment of interest. For example, the system 100 may determine, with low ambiguity, the locations of the cross correlation peaks corresponding to the range of the selected targets 112, and may then determine the respective target ranges based on the peak locations.

It should be understood that instead of transmitting multiple broadband pings and band-pass filtering the resulting echoes, as in the second example above, multiple narrow-band pings corresponding to each of the frequency sub-bands 6-18 kHz, 18-31 kHz, 31-43 kHz, 43-56 kHz, 56-68 kHz, 68-81 kHz, and 81-93 kHz may alternatively be transmitted, thereby obviating the need for band-pass filtering. In both cases, the results generated by the data analyzer are essentially the same, i.e., many estimates for each frequency sub-band, and therefore many distributions for the peak estimates. It is understood that the data analysis results obtained from transmitting the multiple broadband pings and the multiple narrow-band pings may be combined for empirically estimating the lowest possible SNR.

Figure 5A:
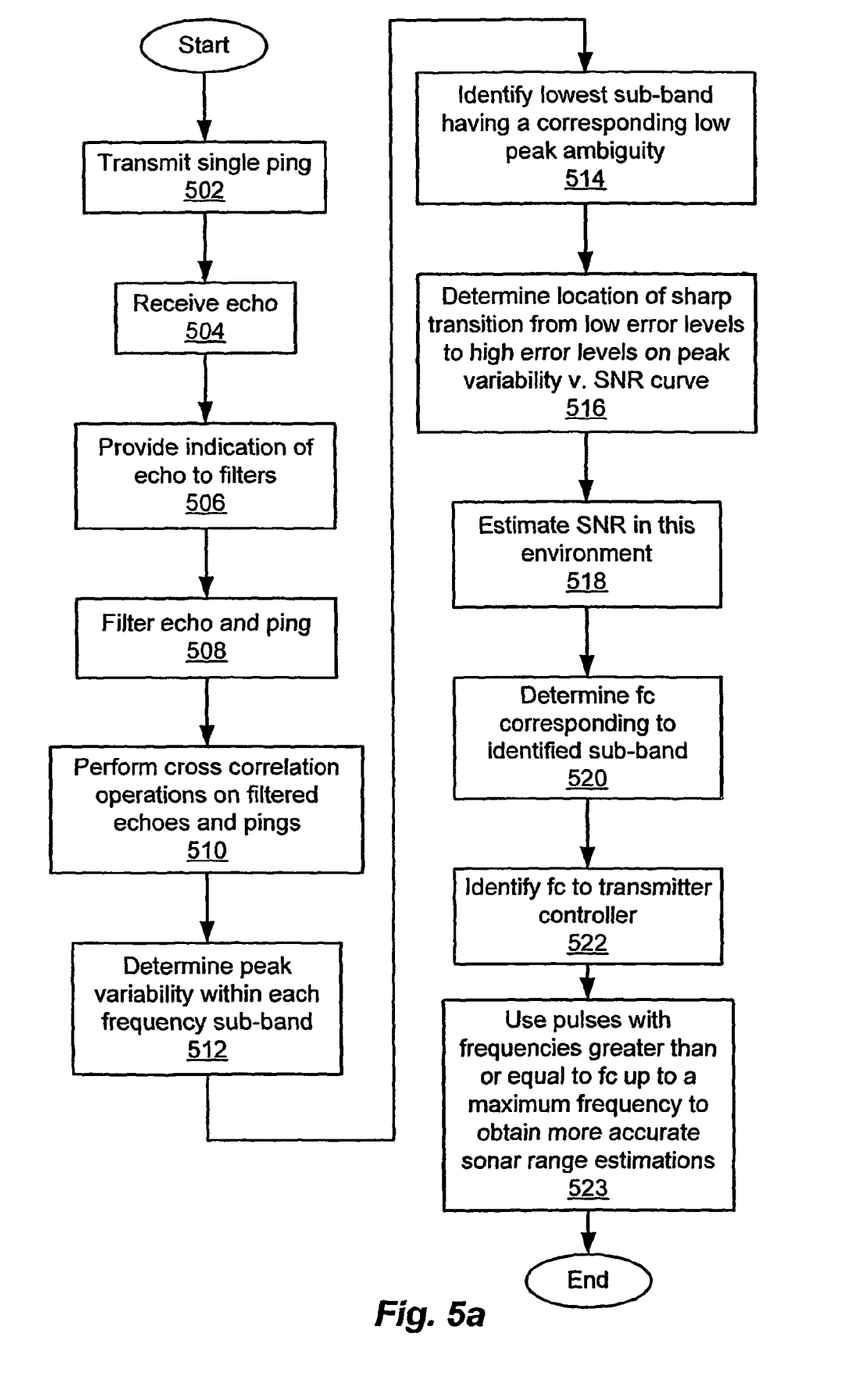
FIGS. 5a-5b are flow diagrams illustrating methods of operating the system of FIG. 1.

A first method of operating the presently disclosed system for estimating the SNR in a noisy sonar environment is illustrated by reference to FIG. 5a. As depicted in step 502, a sonar transmitter transmits a single sonar pulse ("ping") having a predetermined frequency range through a transmission medium. Next, a sonar sensor/receiver receives, as depicted in step 504, a reflected sonar signal ("echo") reflected from a selected target. The receiver then provides, as depicted in step 506, an indication of the echo to a plurality of band-pass filters, which pass respective frequency sub-bands substantially spanning the predetermined frequency range. Next, the band-pass filters filter, as depicted in step 508, the echo and a representation of the transmitted ping. A cross correlator then performs multiple cross correlation operations on the filtered versions of the echo and pulse, as depicted in step 510, and provides multiple sets of cross correlation output data corresponding to the frequency sub-bands to a data analyzer. Next, the data analyzer determines, as depicted in step 512, the variability of cross correlation peaks within each one of the frequency sub-bands, and identifies, as depicted in step 514, the lowest frequency sub-band having a corresponding low peak ambiguity. The data analyzer then determines, as depicted in step 516, the break point on the peak variability versus SNR curve corresponding to the identified frequency sub-band in this sonar environment where the sharp transition from low error levels to high error levels begins. Next, the data analyzer estimates, as depicted in step 518, the SNR in the sonar environment to be the SNR corresponding to the break point determined in step 516. The data analyzer then determines, as depicted in step 520, the center frequency corresponding to the identified frequency sub-band. This is the highest center frequency that has not yet been affected by ambiguity. Next, the data analyzer identifies the center frequency to a controller, as depicted in step 522, and the controller controls the sonar transmitter to emit pulses toward the target at frequencies greater than or equal to that center frequency, up to the maximum frequency available to the system hardware. The sonar system then uses these pulses, as depicted in step 523, to obtain more accurate sonar range estimations within the environment of interest.

Figure 5B:
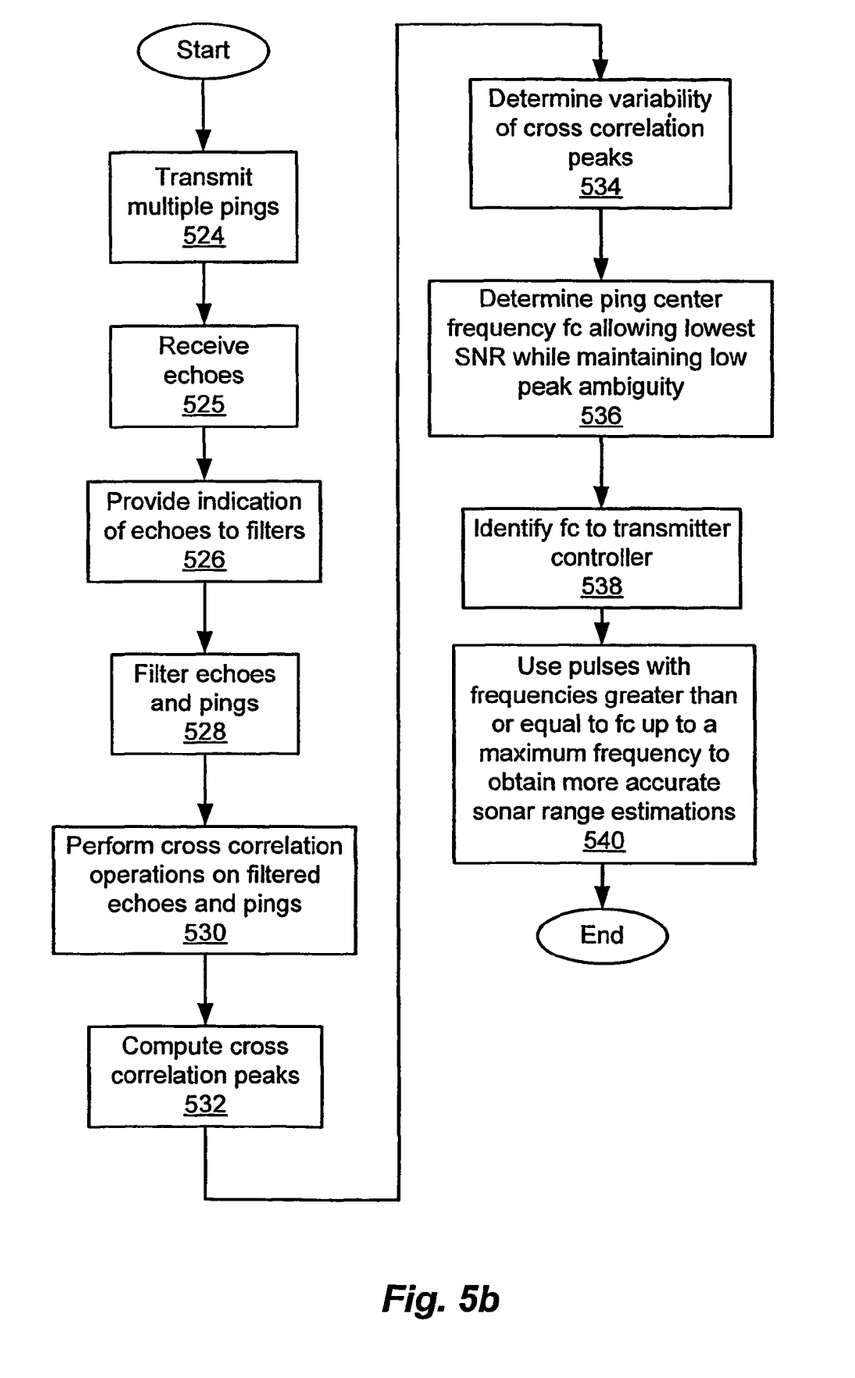

A second method of operating the presently disclosed system for estimating the SNR in a noisy sonar environment is illustrated by reference to FIG. 5b. As depicted in step 524, a sonar transmitter transmits multiple broadband pings having a predetermined frequency range and predetermined center frequencies fc through a transmission medium. Next, a sonar sensor/receiver receives, as depicted in step 525, reflected sonar signals (echoes) reflecting from one or more selected targets. The receiver then provides, as depicted in step 526, indications of the echoes to a plurality of band-pass filters, which pass respective frequency sub-bands having respective center frequencies. Next, the band-pass filters filter, as depicted in step 528, the echoes and representations of the transmitted pings. A cross correlator then performs multiple cross correlation operations on the filtered versions of the echoes and pings, as depicted in step 530, and provides multiple sets of cross correlation output data corresponding to the respective center frequencies to a data analyzer. Next, the data analyzer computes, as depicted in step 532, a cross correlation peak for each ping, and determines, as depicted in step 534, the variability of cross correlation peaks within each sub-band by a statistical analysis of the peak locations. The data analyzer then determines, as depicted in step 536, the center frequency that allows the lowest SNR while maintaining a low peak ambiguity, using the results of the statistical analysis of step 534. This is the highest center frequency that has not yet been affected by ambiguity. Next, the data analyzer identifies the center frequency to a controller, as depicted in step 538, and the controller controls the sonar transmitter to emit pulses toward the target at frequencies greater than or equal to that center frequency, up to the maximum frequency available to the system hardware. The sonar system then uses these pulses, as depicted in step 540, to obtain more accurate sonar range estimations within the environment of interest.

Having described the above illustrative embodiments, other alternative embodiments or variations may be made. For example, although the controller 111 is depicted in FIG. 1 as a separate functional block, it should be recognized that the functionality of the controller 111 may alternatively be integrated either within the data analyzer 110 or within the transmitter 103.

It should also be understood that when the characteristics of the transmitted pulse are unknown, e.g., in the case of a passive sonar system, the transmitted pulse may be estimated by averaging using multiple echoes or returns. Such averaging may take into account some distortions (known or estimated) to the pulse. The estimated signal may then be applied to the cross correlator, as described above.

In addition, it was described in the second example above that multiple echoes and pings are provided to a plurality of band-pass filters for filtering before performing cross correlation operations on the echoes and pings. However, in an alternative embodiment, the plurality of filters may be omitted, and unfiltered representations of the echoes and pings may be provided directly to the cross correlator.

In addition, it was described that for pulses having a fixed centralized root mean square bandwidth $B_{CRMS}$ and different center frequencies fc, the behavior of the simulation curves 301-307 within region I (see FIGS. 3a-3b) is characteristic of the performance of a coherent receiver, and the behavior of the curves 301-307 following their sharp transitions from low error levels to high error levels within region II (see FIGS. 3a-3b) is characteristic of the performance of a semi-coherent receiver. However, it should be understood that simulation curves similar to the curves 301-307 may be generated to determine the root mean square error (RMSE, seconds) as a function of SNR (dB) and centralized root mean square bandwidth $B_{CRMS}$ for a fixed center frequency fc.

In this case, the behavior of the simulation curves would be characteristic of the performance of a coherent receiver for high SNR levels, and as the SNR level decreases, the pulses with lower $B_{CRMS}$ values would be affected by peak ambiguity first, thereby causing their performance to degrade to that of a semi-coherent receiver. In general, the pulses with the larger $B_{CRMS}$ values are more resilient to peak ambiguity. As shown in FIGS. 3a-3b, as SNR levels decrease, the pulses with higher center frequencies fc are affected by peak ambiguity first, and the pulses with lower center frequencies fc are more resilient to peak ambiguity. In a practical sonar system, however, only a limited range of frequencies may be employed for the sonar pulses and the sonar receiver. This limitation places bounds on the pulses' center frequency fc and centralized root mean square bandwidth $B_{CRMS}$.

The effect of this limited frequency range within the practical sonar system is illustrated by the performance curve 308 (see FIG. 3b). For example, the maximum allowable $B_{CRMS}$ (e.g., 2.1 kHz) is the same for all of the pulses used to generate the curve 308. Further, for high levels of SNR (region I; see FIG. 3b), the behavior of the performance curve 308 is characteristic of a coherent receiver up to break point 9, which corresponds to the maximum allowable fc (e.g., 87 kHz). These maximum allowable $B_{CRMS}$ and fc values are a direct consequence of the limited frequency range of the practical sonar system.

In addition, the sonar system 100 (see FIG. 1) may further include a user input device such as a keyboard or control panel to allow the user to configure the system. Further, the sonar sensor 102 may include at least one suitable sonar transducer (e.g., a hydrophone sensor) operative to detect an echo signal, and the sonar receiver 104 may include conventional filters and amplifiers for enhancing the echo signal before providing the signal to the plurality of band-pass filters 106. The sonar system 100 may also include one or more computers operative to store and process the sonar signal data and the cross correlation output data. For example, the data analyzer 110 and the controller 111 may include one or more microprocessors, application specific integrated circuits (ASICs), and/or microcomputers operative to analyze the signal and output data and to control the sonar transmitter 103, in accordance with the methods disclosed herein. In addition, it is appreciated that the presently disclosed system for estimating SNR in noisy environments may be implemented for simulation and/or operation using one or more programmed general purpose computers and/or special purpose hardware.

It should be understood that the presently disclosed systems and methods are suitable for measuring delays between a set of consecutive signals, such as echoes or returns from a complex target or multiple targets. These signals may be pulses provided by an active transmission source such as an active sonar system, or may comprise a transmitted pulse and an echo returning from the selected target.

It will also be appreciated by those of ordinary skill in the art that modifications to and variations of the above-described noise adaptive sonar signal processor may be made without departing from the inventive concepts disclosed herein. Accordingly, the invention should not be viewed as limited except as by the scope and spirit of the appended claims.

What is claimed is:

1. A system for estimating a range of at least one object in an environment, comprising:
   a transmitter configured to transmit at least one first signal through a predetermined transmission medium within the environment, the first signal having a predetermined frequency range and an associated center frequency, wherein the first signal travels through the transmission medium until it strikes at least one object, thereby generating at least one second signal reflected from the object; and a sub-system including a cross correlator, the cross correlator being operative to receive representations of the first and second signals, and to perform at least one cross correlation operation on the first and second signals to detect at least one cross correlation peak, the sub-system being operative to estimate the range of the object based on the detected cross correlation peak, wherein the sub-system is further operative to estimate a signal-to-noise ratio (SNR) in the environment, the SNR being at least partially dependent upon the frequency associated with the first signal, and to control the transmitter to dynamically change at least the frequency associated with the first signal based on the estimated SNR.

2. The system of claim 1 wherein the sub-system further includes a plurality of band-pass filters, each band-pass filter being configured to pass a respective sub-band of frequencies, each band-pass filter being further configured to receive the representations of the first and second signals, to filter the representations of the first and second signals, and to provide filtered versions of the first and second signals;

the cross correlator being further configured to receive the filtered versions of the first and second signals provided by the respective band-pass filters, and to perform multiple cross correlation operations on the filtered first and second signals, thereby providing cross correlation output data, wherein each cross correlation operation operates on the filtered first and second signals provided by a respective one of the band-pass filters; and a data analyzer configured to receive the cross correlation output data, and to analyze the output data for determining variability of cross correlation peaks within each frequency sub-band, for identifying the lowest frequency sub-band having a corresponding low peak ambiguity, and for estimating the SNR in the environment based on the peak variability and center frequency of the identified frequency sub-band and the predetermined frequency range.

3. The system of claim 2 further including a sensor configured to receive the at least one second signal.

4. The system of claim 3 wherein the sensor comprises at least one hydrophone sensor.

5. The system of claim 3 further including a receiver configured to receive an indication of the second signal from the sensor, and to provide the representation of the second signal to the sub-system.

6. The system of claim 2 wherein the transmitter is configured to transmit a plurality of first signals through the transmission medium, each first signal having the predetermined frequency range, wherein the plurality of first signals travel through the transmission medium until they strike at least one object, thereby generating a plurality of second signals reflected from the object.

7. The system of claim 6 wherein the data analyzer is further configured to analyze the cross correlation output data for determining a plurality of cross correlation peak locations relative to respective ambiguity functions corresponding to the frequency sub-bands.

8. The system of claim 7 wherein the data analyzer is further configured to perform a statistical analysis on the plurality of peak locations for determining the variability of cross correlation peaks within each frequency sub-band.

9. The system of claim 6 wherein each first signal comprises a sonar ping.

10. The system of claim 2 wherein the respective frequency sub-bands are contiguous and substantially span the predetermined frequency range of the first signal.

11. The system of claim 2 wherein the system operates as a coherent receiver for signal frequencies ranging from a maximum frequency through the identified frequency sub-band.

12. The system of claim 2 wherein the system operates as a semi-coherent receiver for signal frequencies ranging from the identified frequency sub-band to a minimum frequency.

13. The system of claim 1 wherein the predetermined frequency range is a maximum centralized root mean square bandwidth of the first signal.

14. The system of claim 1 wherein the predetermined transmission medium is one of air, water, soil, and living tissue.

15. A method of estimating a range of at least one object in an environment, comprising the steps of:

transmitting at least one first signal through a predetermined transmission medium within the environment by a transmitter, the first signal having a predetermined frequency range and an associated center frequency, wherein the first signal travels through the transmission medium until it strikes at least one object, thereby generating at least one second signal reflected from the object;

receiving representations of the first and second signals by a cross correlator;

performing at least one cross correlation operation on the first and second signals to detect at least one cross correlation peak by the cross correlator;

estimating the range of the object based on the detected cross correlation peak;

estimating a signal-to-noise ratio (SNR) in the environment, the SNR being at least partially dependent upon the frequency associated with the first signal; and controlling the transmitter for dynamically changing at least the frequency associated with the first signal based on the estimated SNR.

16. The method of claim 15 further including the steps of:

receiving the representations of the first and second signals by a plurality of band-pass filters, each band-pass filter being configured to pass a respective sub-band of frequencies;

filtering the representations of the first and second signals by each band-pass filter;

receiving the filtered versions of the first and second signals by the cross correlator;

performing multiple cross correlation operations on the filtered first and second signals by the cross correlator, thereby providing cross correlation output data, wherein each cross correlation operation operates on the filtered first and second signals provided by a respective one of the band-pass filters;

receiving the cross correlation output data by a data analyzer;

determining variability of cross correlation peaks within each frequency sub-band by the data analyzer; and identifying the lowest frequency sub-band having a corresponding low peak ambiguity by the data analyzer, wherein the SNR estimating step includes estimating the SNR based on the peak variability and center frequency of the identified frequency sub-band and the predetermined frequency range by the data analyzer.

17. The method of claim 16 further including the step of receiving the at least one second signal by a sensor.

18. The method of claim 17 wherein the sensor comprises at least one hydrophone sensor.

19. The method of claim 17 further including the steps of receiving an indication of the second signal from the sensor by a receiver, and providing the representation of the second signal to the plurality of band-pass filters by the receiver.

20. The method of claim 16 wherein the transmitting step includes transmitting a plurality of first signals through the transmission medium by the transmitter, each first signal having the predetermined frequency range, wherein the plurality of first signals travel through the transmission medium until they strike at least one object, thereby generating a plurality of second signals reflected from the object.

21. The method of claim 20 further including the step of analyzing the cross correlation output data by the data analyzer for determining a plurality of cross correlation peak locations relative to respective ambiguity functions corresponding to the frequency sub-bands.

22. The method of claim 21 further including the step of performing a statistical analysis of the plurality of peak locations by the data analyzer for determining the variability of cross correlation peaks within each frequency sub-band.

23. The method of claim 20 wherein each first signal comprises a sonar ping.

24. The method of claim 18 wherein the respective frequency sub-bands are contiguous and substantially span the predetermined frequency range of the first signal.

25. The method of claim 16 further including the step of operating as a coherent receiver for signal frequencies ranging from a maximum frequency through the identified frequency sub-band.

26. The method of claim 16 further including the step of operating as a semi-coherent receiver for signal frequencies ranging from the identified frequency sub-band to a minimum frequency.

27. The method of claim 15 wherein the predetermined frequency range is a maximum centralized root mean square bandwidth of the first signal.

28. The method of claim 15 wherein the predetermined transmission medium is one of air, water, soil, and living tissue.

29. A system for estimating a range of at least one object in an environment, comprising:
   a transmitter configured to transmit at least one first signal through a predetermined transmission medium within the environment, the first signal having a predetermined frequency range and an associated center frequency, wherein the first signal travels through the transmission medium until it strikes at least one object, thereby generating at least one second signal reflected from the object; and
   a sub-system including a cross correlator, the cross correlator being operative to receive representations of the first and second signals, and to perform at least one cross correlation operation on the first and second signals to detect at least one cross correlation peak, the sub-system being operative to estimate the range of the object based on the detected cross correlation peak,
   wherein the sub-system is further operative to control the transmitter to dynamically change at least the frequency associated with the first signal based on a predetermined signal-to-noise ratio (SNR) in the environment.

30. A method of estimating a range of at least one object in an environment, comprising the steps of:
   transmitting at least one first signal through a predetermined transmission medium within the environment by a transmitter, the first signal having a predetermined frequency range and an associated center frequency, wherein the first signal travels through the transmission medium until it strikes at least one object, thereby generating at least one second signal reflected from the object;
   receiving representations of the first and second signals by a cross correlator;
   performing at least one cross correlation operation on the first and second signals to detect at least one cross correlation peak by the cross correlator; and
   estimating the range of the object based on the detected cross correlation peak,
   wherein the transmitting step includes controlling the transmitter to dynamically change at least the frequency associated with the first signal based on a predetermined signal-to-noise ratio (SNR) in the environment.

* * * * *

UNITED STATES PATENT AND TRADEMARK OFFICE
CERTIFICATE OF CORRECTION

PATENT NO.         : 7,239,580 B2
APPLICATION NO.    : 10/559623
DATED              : July 3, 2007
INVENTOR(S)        : Nathan Intrator et al.

It is certified that error appears in the above-identified patent and that said Letters Patent is hereby corrected as shown below:

Column 5, equation (1), line 48, delete "$\psi_e \cdot \psi_p(\tau)$" and replace it with -- $\psi_e \circ \psi_p(\tau)$ --.

Signed and Sealed this

Twenty-ninth Day of September, 2009

David J. Kappos
*Director of the United States Patent and Trademark Office*